(12) United States Patent
Hashimoto

(10) Patent No.: US 11,153,497 B2
(45) Date of Patent: Oct. 19, 2021

(54) IMAGE CAPTURING DEVICE

(71) Applicant: Mitsubishi Electric Corporation, Tokyo (JP)

(72) Inventor: Mitsuo Hashimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/254,871

(22) PCT Filed: Jul. 17, 2018

(86) PCT No.: PCT/JP2018/026687
§ 371 (c)(1),
(2) Date: Dec. 22, 2020

(87) PCT Pub. No.: WO2020/016921
PCT Pub. Date: Jan. 23, 2020

(65) Prior Publication Data
US 2021/0185236 A1    Jun. 17, 2021

(51) Int. Cl.
*H04N 5/232* (2006.01)

(52) U.S. Cl.
CPC ..... *H04N 5/23299* (2018.08); *H04N 5/23254* (2013.01); *H04N 5/23261* (2013.01)

(58) Field of Classification Search
CPC .......... H04N 5/23299; H04N 5/23254; H04N 5/23261; H04N 7/18; H04N 5/232
See application file for complete search history.

(56) References Cited

U.S. PATENT DOCUMENTS 8,264,554 B2 * 9/2012 Matsutani .............. G03B 17/56
348/208.4
8,964,047 B2 * 2/2015 Robinson ........... H04N 5/23248
348/208.5

FOREIGN PATENT DOCUMENTS

JP  2017-204825 A  11/2017
JP  2017-224882 A  12/2017

OTHER PUBLICATIONS

International Search Report and Written Opinion dated Oct. 9, 2018, received for PCT Application No. PCT/JP2018/026687, Filed on Jul. 17, 2018, 9 pages including English Translation.

* cited by examiner

*Primary Examiner* — Twyler L Haskins
*Assistant Examiner* — Angel L Garces-Rivera
(74) *Attorney, Agent, or Firm* — Xsensus LLP

(57) ABSTRACT

An image capturing device includes inclination detecting circuitry to detect an inclination from a reference position and output the inclination as angle data; feature point extracting circuitry to extract, based on both a reference position image and a current position image, respective feature points; amount of deviation calculating circuitry to calculate an inclination angle based on the angle data, and calculating an amount of deviation in pixels on the basis of the feature points; and correcting method determining circuitry to, when it is determined that the inclination angle is within a range in which the angle can be corrected, the range being equal to or greater than a lower limit and equal to or less than an upper limit, provide a correction instruction to make a correction to the inclination angle and then to make a fine adjustment to the inclination of the angle of view.

10 Claims, 5 Drawing Sheets

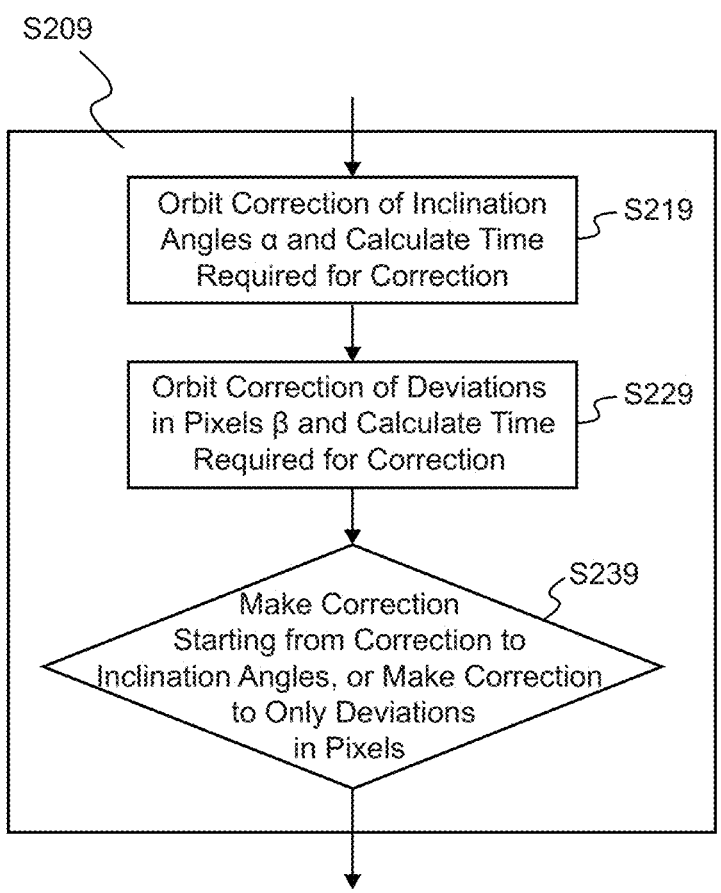

IMAGE CAPTURING DEVICE

CROSS-REFERENCE TO RELATED APPLICATION

The present application is based on PCT filing PCT/JP2018/026687, filed Jul. 17, 2018, the entire contents of which are incorporated herein by reference.

TECHNICAL FIELD

The present disclosure relates to an image capturing device that makes a correction to an inclination of the angle of view with a high degree of accuracy, the inclination being caused by an external force, a vibration, or the like.

BACKGROUND ART

In conventional image capturing devices provided with an image sensor such as a CCD, camera platforms that can rotate are provided, a PTZ (in a PAN direction, in a TILT direction, and in a ZOOM direction) operation can be performed on the camera platforms, and the image capturing devices are usually installed in an outdoor or indoor environment for surveillance uses.

When an image capturing device is installed, image capturing is started after the angle of view is adjusted so that a desired object image can be captured. When a base on which a surveillance camera is installed or its support itself is influenced by the weather, disasters, aged deterioration, and so on, so that a large inclination occurs, an operator needs to view an image captured by the surveillance camera to determine the change, and go to the spot and manually makes a readjustment to restore the capturing direction and the angle of view of the camera to the ones at the time of installation. Because of such manual restoration, not only the time for restoring the camera to the state before the image deviation, but also the personnel expenses are required. Moreover, because a strict adjustment to the angle of view is required of image capturing devices intended for surveillance systems, the restoration is greatly influenced by worker's skill and it is very difficult to adjust the angle of view to the original one with a high degree of accuracy.

On the other hand, a technique of displaying an alarm when a deviation of a captured image is detected has been proposed, and, for example, in Patent Literature 1, a technique of providing a camera device that can extract a feature point in a current position image, compare the feature point with a feature point of a captured image, this feature point being extracted in a previous setup of an area, and, when a positional error equal to or greater than a threshold exists between the corresponding feature points, determine that there is a change in the setup of an area, and transmit area change detection information to a next-stage server is proposed.

CITATION LIST

Patent Literature

Patent Literature 1: JP 2017-204825 A

SUMMARY OF INVENTION

Technical Problem

A problem with the image capturing device disclosed in Patent Literature 1 is that although a change in the set-up area of a reference image can be detected, in the case in which there is a large deviation reaching the outside of the set-up area, it is impossible to make a correction using the feature point of the captured image. Another problem is that even in the case in which there is a deviation inside in the set-up area, when, for example, the deviation angle is large, it takes much time to make only a correction to the angle of view by extracting feature points, so that the efficiency is low.

A further problem is that in the case in which an image capture area deviates greatly, it is impossible to make a correction through image processing or it takes much time to make a correction. Although as a measure against this problem, there is also considered a method of adjusting a deviation angle detected by an angular velocity sensor or the like, a problem with this method is that because a fine adjustment of image processing cannot be performed, a captured image cannot be acquired correctly.

The present disclosure is made in order to solve the above-mentioned problems, and it is therefore an object of the present disclosure to provide an image capturing device that can make a correction efficiently with a high degree of accuracy.

Solution to Problem

An image capturing device of the present disclosure includes: a camera platform mechanism; a lens mechanism; and a controller having image capturing circuitry to perform analog to digital conversion on an image transmitted from the lens mechanism, image inputting circuitry to perform image processing on a digital signal transmitted from the image capturing circuitry, a memory to record an image processed by the image inputting circuitry, inclination detecting circuitry to detect an inclination from a reference position and outputting the inclination as angle data, feature point extracting circuitry to extract, on the basis of both a reference position image and a current position image, respective feature points, amount of deviation calculating circuitry to calculate an inclination angle on the basis of the angle data, and calculating calculate an amount of deviation in pixels on the basis of the feature points, correcting method determining circuitry to, when it is determined that the inclination angle is within a range in which the angle can be corrected, the range being equal to or greater than a lower limit and equal to or less than an upper limit, provide a correction instruction to make a correction to the inclination angle and then make a fine adjustment to the inclination of the angle of view, whereas when the inclination angle is less than the lower limit, provide an instruction to make a fine adjustment to the inclination of the angle of view, and pan tilt zoom operating circuitry to control the camera platform mechanism and the lens mechanism on the basis of the instruction of the correcting method determining circuitry.

Advantageous Effects of Invention

According to the present disclosure, because the image capturing device operates in such a way as to select an optimal correcting method dependently on the degree of angular deviation from the reference position of the image capturing device, the inclination of the angle of view of the image capturing device can be corrected efficiently with a high degree of accuracy.

BRIEF DESCRIPTION OF DRAWINGS

FIG. 6 is a flowchart explaining a process of determining a correcting method from inclination angles and amounts of deviation in pixels in Embodiment 2.

DESCRIPTION OF EMBODIMENTS

Hereafter, the embodiments of the present disclosure will be explained in detail with reference to the drawings.

Embodiment 1

Figure 1:
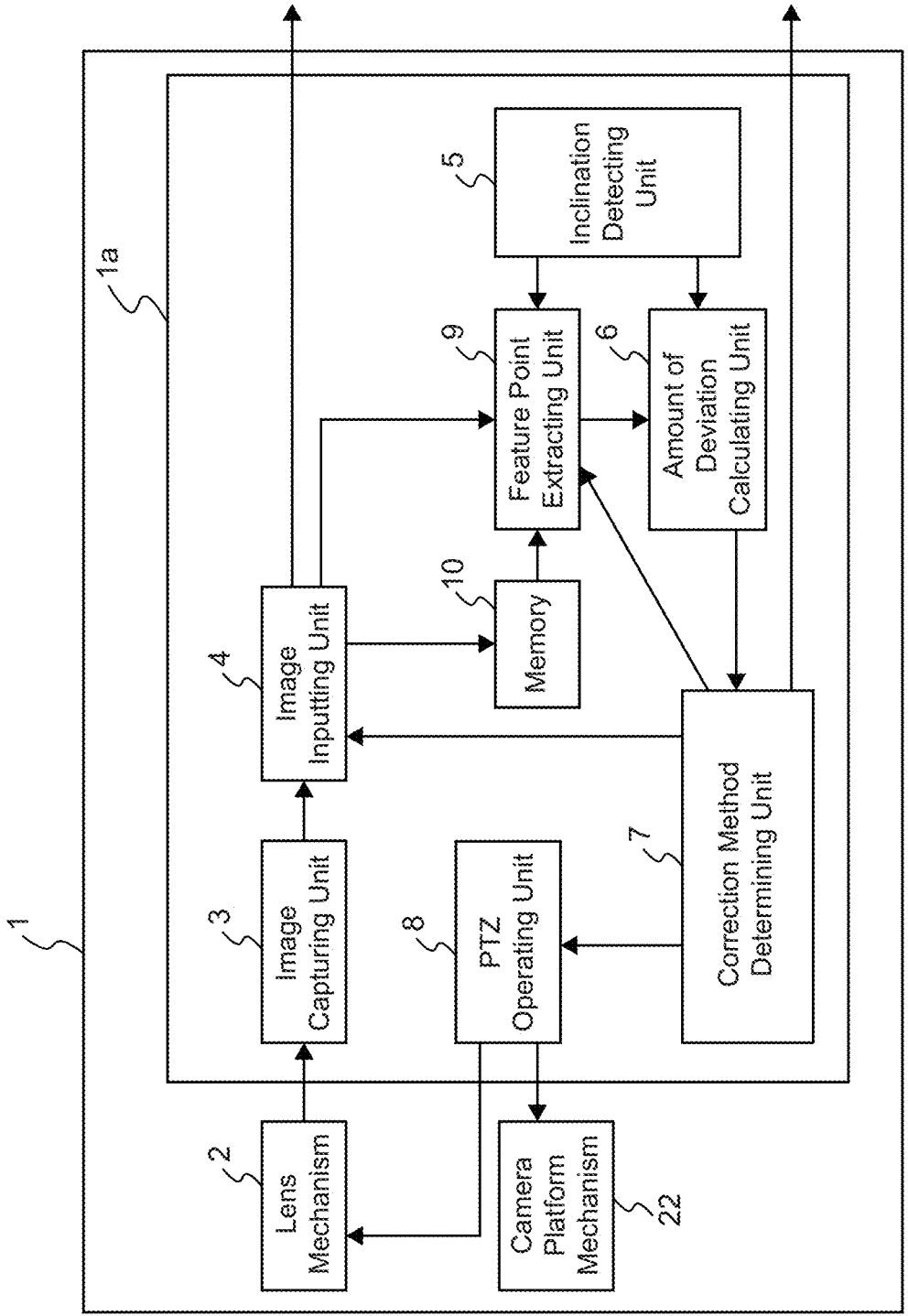
FIG. 1 is a block diagram showing the functional configuration of image capturing devices according to Embodiments 1 and 2 of the present disclosure.

FIG. 1 is a block diagram showing the configuration of an image capturing device according to Embodiment 1 of the present disclosure.

As shown in FIG. 1, the image capturing device 1 includes an image capturing device control unit 1a, a lens mechanism 2, and a camera platform mechanism 22. The camera platform mechanism 22 maintains the posture of the image capturing device 1. The lens mechanism 2 transmits an image of an object to be captured to the image capturing device control unit 1a. The image capturing device control unit 1a includes an image capturing unit 3, an image inputting unit 4, an inclination detecting unit 5, an amount of deviation calculating unit 6, a correcting method determining unit 7, a pan tilt zoom operating unit (PTZ operating unit) 8, a feature point extracting unit 9, and a memory 10.

Figure 2:
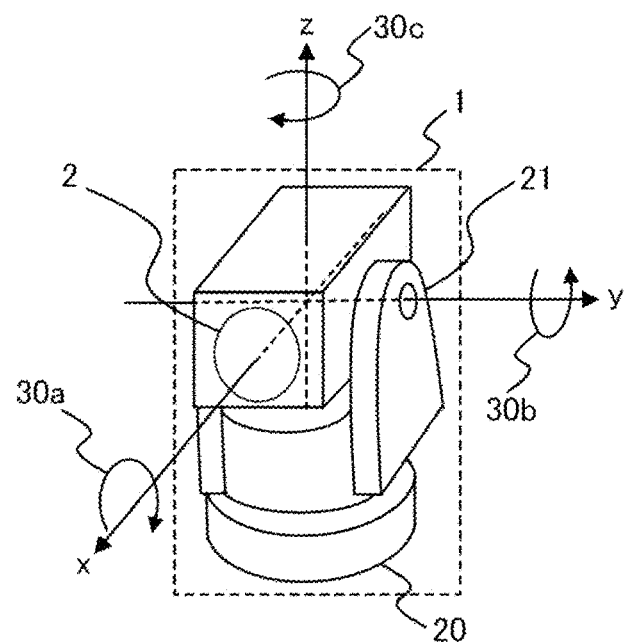
FIG. 2 is an explanatory drawing showing a relation between image capturing devices in examples according to Embodiments 1 and 2 of the present disclosure, and an X axis, a Y axis and a Z axis.

Further, the image capturing device 1 according to Embodiment 1 is assumed to be a swivel surveillance camera that performs control via a communication network such as the Internet, as an example. FIG. 2 is an explanatory drawing showing a relation between a swivel surveillance camera which is an example of the image capturing device, and an X axis, a Y axis and a Z axis. A dashed line box denotes the image capturing device 1, and the image capturing device captures an image of an object to be captured with being oriented toward a desired direction and its angle of view being adjusted. The three axes (X, Y, Z) at a time when the image capturing device 1 is centered and the directions of the respective axes are shown in FIG. 2, and 30a denotes a rotation around the X axis, 30b denotes a rotation around the Y axis, and 30c denotes a rotation around the Z axis. The camera platform mechanism 22 includes a PAN camera platform 20 and a TILT camera platform 21. The PAN camera platform 20 can operate the rotation (30c) around the Z axis, the TILT camera platform 21 can operate the rotation (30b) around the Y axis, and the lens mechanism 2 can operate the rotation (30a) around the X axis.

Figure 3:
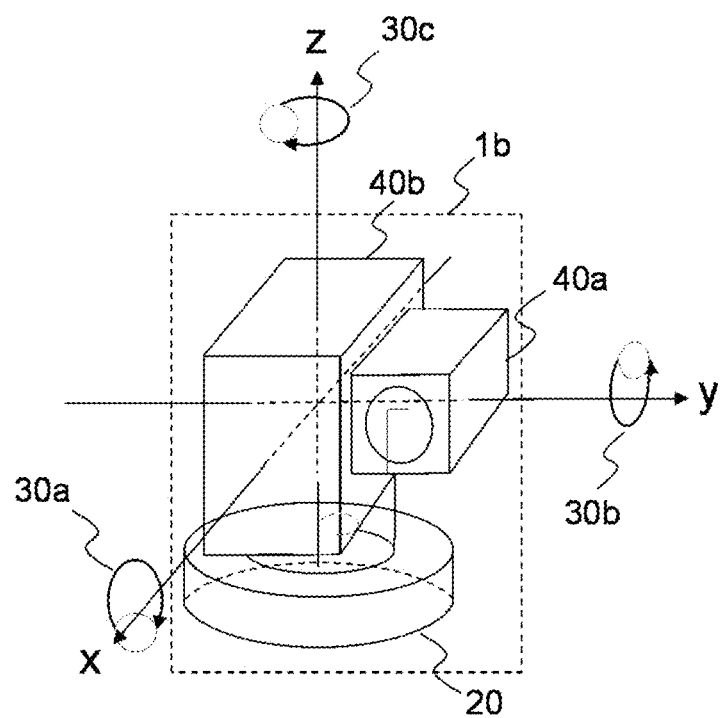
FIG. 3 is an explanatory drawing showing a relation between image capturing devices in examples according to Embodiments 1 and 2 of the present disclosure, and an X axis, a Y axis and a Z axis.

FIG. 3 is an explanatory drawing showing a relation between an image capturing device 1b which differs from that of FIG. 2 in the outside shape, and an X axis, a Y axis and a Z axis. The image capturing device 1b includes a head unit 40a and a housing unit 40b. A TILT camera platform is mounted in the housing unit, and can rotate the head unit 40a around the Y axis. Also in this case, an inclination detecting unit 5 (gyro sensor) is located at the position where the X, Y, and Z axes intersect.

Next, the configuration and the operation of each unit of the image capturing device control unit 1a will be explained on the basis of FIG. 1.

The image capturing unit 3 captures an image of an object to be captured, the image passing through the lens mechanism 2, and performs photoelectric conversion and analog to digital conversion (AD conversion).

The image inputting unit 4 includes a central processing unit (CPU) or a digital signal processor (DSP) and performs image processing including color interpolation processing, automatic exposure processing, and white balance processing on a digital signal transmitted from the image capturing unit 3, thereby generating an image which can be recognized by persons, and, after that, transmits the image to a next-stage system device or a monitor.

The inclination detecting unit 5 is hardware which is mounted in the image capturing device 1 and detects inclination angles of the image capturing device 1, and includes an angular velocity sensor such as a gyro sensor. A gyro sensor outputs, as analog data or digital data (e.g. 10-bit data), angular speeds (speeds at which rotations are performed in the X axis, Y axis, and Z axis directions), the angular speeds being applied to the sensor and a type of angle data.

The amount of deviation calculating unit 6 is hardware which includes, for example, a CPU. The angle data sent from the inclination detecting unit 5 is integrated by the amount of deviation calculating unit 6, and with respect to the X axis, Y axis, and Z axis directions, the respective inclination angles are calculated. In the case in which the output of the gyro sensor is analog data, conversion from the analog data to digital data (AD conversion) is performed in the CPU and, after that, integration is performed, and with respect to the X axis, Y axis, and Z axis directions, the respective inclination angles are calculated.

The correcting method determining unit 7 operates as a control unit used for a deviation correcting process of the image capturing device of the present disclosure. The correcting method determining unit 7 is hardware which includes, for example, a CPU. The correcting method determining unit 7 determines whether or not to correct the current position of the image capturing device 1 to the angles before inclined on the basis of the digital data (e.g. 10-bit data) corresponding to the inclination angles transmitted from the amount of deviation calculating unit 6, and, when restoring the current position of the image capturing device 1 to the angles before inclined, first calculates the required amounts of movements of the PAN camera platform 20 and the TILT camera platform 21 (both of them are shown in FIG. 2) of the camera platform mechanism 22, also calculates the amount of a zooming adjustment to be made after the PAN camera platform 20 and the TILT camera platform 21 are moved, sends pieces of calculated digital data to the PTZ operating unit 8, and outputs a correction instruction.

The PTZ operating unit 8 performs a pan tilt zoom operation on the posture of the image capturing device 1 in accordance with the correcting method from the correcting method determining unit 7.

The correcting method determining unit 7 determines whether or not to restore the position of the image capturing device 1 to the angles before inclined in accordance with each of the inclination angles with respect to the X, Y, and Z axes. More specifically, when the inclination angle with respect to any one of the X, Y, and Z axes is equal to or greater than a lower limit A (e.g. A=5 degrees) and the inclination angles with respect to all of the X, Y, and Z axes are equal to or less than an upper limit B (e.g. B=90 degrees), the posture of the image capturing device is corrected to the angles before inclined. Simultaneously, a signal indicating that "a correction is made because the image capturing device has been inclined" is transmitted to the next-stage system.

Although the correcting method determining unit 7 performs the determination of whether or not to restore the posture of the image capturing device 1 to the angles before inclined on the basis of the condition that the inclination angle with respect to any one of the X, Y, and Z axes is equal to or greater than the lower limit A (e.g. 5 degrees), for the X, Y, and Z axes, respective reference values may be set up by the next-stage system and the correcting method determining unit may perform the determination on the basis of the combination of these reference values. For example, a lower limit AX may be set up for the X axis, a lower limit AY may be set up for the Y axis, and a lower limit AZ may be set up for the Z axis, and, when differences between AX, AY, and AZ and the respective angles are equal or greater than +5 degrees or are equal or less than −5 degrees, the posture may be restored to the angles before inclined. In either case, using the multiple axes: the X, Y, and Z axes, the posture of the image capturing device can be corrected in all the directions.

When the inclination angle in any one of the X, Y, and Z axes is greater than the upper limit B, it is determined that it is impossible to, even when operations are performed on the PAN camera platform 20 and the TILT camera platform 21, restore the to posture to the one before deviated, and a signal indicating "although the image capturing device has been inclined, no correction has been made because an inclination angle is greater than a correctable angle" is transmitted to the next-stage system, an electric signal is also transmitted to the CPU or the DSP of the image inputting unit 4, and the image inputting unit 4 superimposes a marking showing that the posture of the image capturing device has not been corrected, at an appropriate position on a screen on the basis of the electric signal. This marking signal may continue to be displayed for a certain period of time (e.g. 10 minutes), or the display may be stopped when the image inputting unit 4 receives a communication from the next-stage system.

In the next-stage system, by knowing the fact that "although the image capturing device has been inclined, no correction has been made because an inclination angle is greater than a correctable angle", a wasteful PTZ operation needs not be performed and therefore the time required for inclination removal can be shortened. In addition, even when an object to be captured cannot be captured in the angle of view and it becomes impossible to perform surveillance, the image capturing device in question can be identified immediately from the marking displayed on the screen, and it is possible to cope with the failure at an early stage by sending a worker for inclination removal to the spot, for example.

In contrast, after it is determined to make a correction to the above-mentioned inclination angles and a correction is made, or when the inclination angles are less than the lower limit A and no correction is made to the posture, the correcting method determining unit 7 instructs the feature point extracting unit 9 to extract feature points and makes a fine adjustment to the angle of view.

An image processed by the image inputting unit 4 at the time of initial installation is recorded as a reference position image in the memory 10. The feature point extracting unit 9 extracts a reference image feature point Ch1 on the basis of this reference position image, and extracts a current image feature point Ch2 on the basis of a current position image (current image) transmitted from the image inputting unit 4.

In order for the feature point extracting unit 9 to acquire a feature point, for example, there is provided a method of applying a high pass filter (HPF) to an image, to subtract a low frequency component from all frequency components and leave only a high frequency component, thereby extracting an edge. Instead, an eigenvector may be calculated on the basis of the direction of an edge. Instead, a result of extracting a steep luminance variation in the image and performing first order differential or second order differential on the image may be provided.

Pieces of image data about the feature points Ch1 and Ch2 extracted by the feature point extracting unit 9 are transmitted to the amount of deviation calculating unit 6, and an amount of deviation in pixels $\beta$ is calculated by the amount of deviation calculating unit 6 on the basis of the feature points Ch1 and Ch2 and is transmitted to the correcting method determining unit 7. The amount of deviation in pixels $\beta$ includes an amount of horizontal deviation in pixels $\beta x$ and an amount of vertical deviation in pixels $\beta y$ on the screen.

The memory 10 records the reference position image and the current position image which have been processed by the image inputting unit 4.

The correcting method determining unit 7 further determines whether or not to make a fine adjustment to the inclination of the angle of view of the image capturing device 1 on the basis of the amount of deviation between the feature points Ch1 and Ch2. When either one of the amount of horizontal deviation in pixels $\beta x$ and the amount of vertical deviation in pixels fly of the feature point of the captured image is equal to or greater than a lower limit C for fine adjustment, it is determined to make a fine adjustment to the inclination of the angle of view of the image capturing device 1. First, required fine adjustment amounts for both the PAN camera platform 20 and the TILT camera platform 21 (both of them are shown in FIG. 2) of the camera platform mechanism 22 are calculated on the basis of the amounts of deviation in pixels $\beta$, the amount of a zooming adjustment to be made after the PAN camera platform 20 and the TILT camera platform 21 are moved is also calculated, and pieces of calculated digital data are sent to the PTZ operating unit 8. The PTZ operating unit 8 operates the image capturing device 1 in a PAN direction, in a TILT direction, and in a ZOOM direction in accordance with the correcting method from the correcting method determining unit 7.

When both the amount of horizontal deviation in pixels $\beta x$ and the amount of vertical deviation in pixels fly are less than the fine adjustment lower limit C, a signal for displaying a message showing "it is not necessary to make a fine adjustment to the angle of view because the amounts of deviation in pixels are less than the fine adjustment lower limit C" is transmitted to the next-stage system without making a fine adjustment to the angle of view, and the operation is ended.

Figure 4:
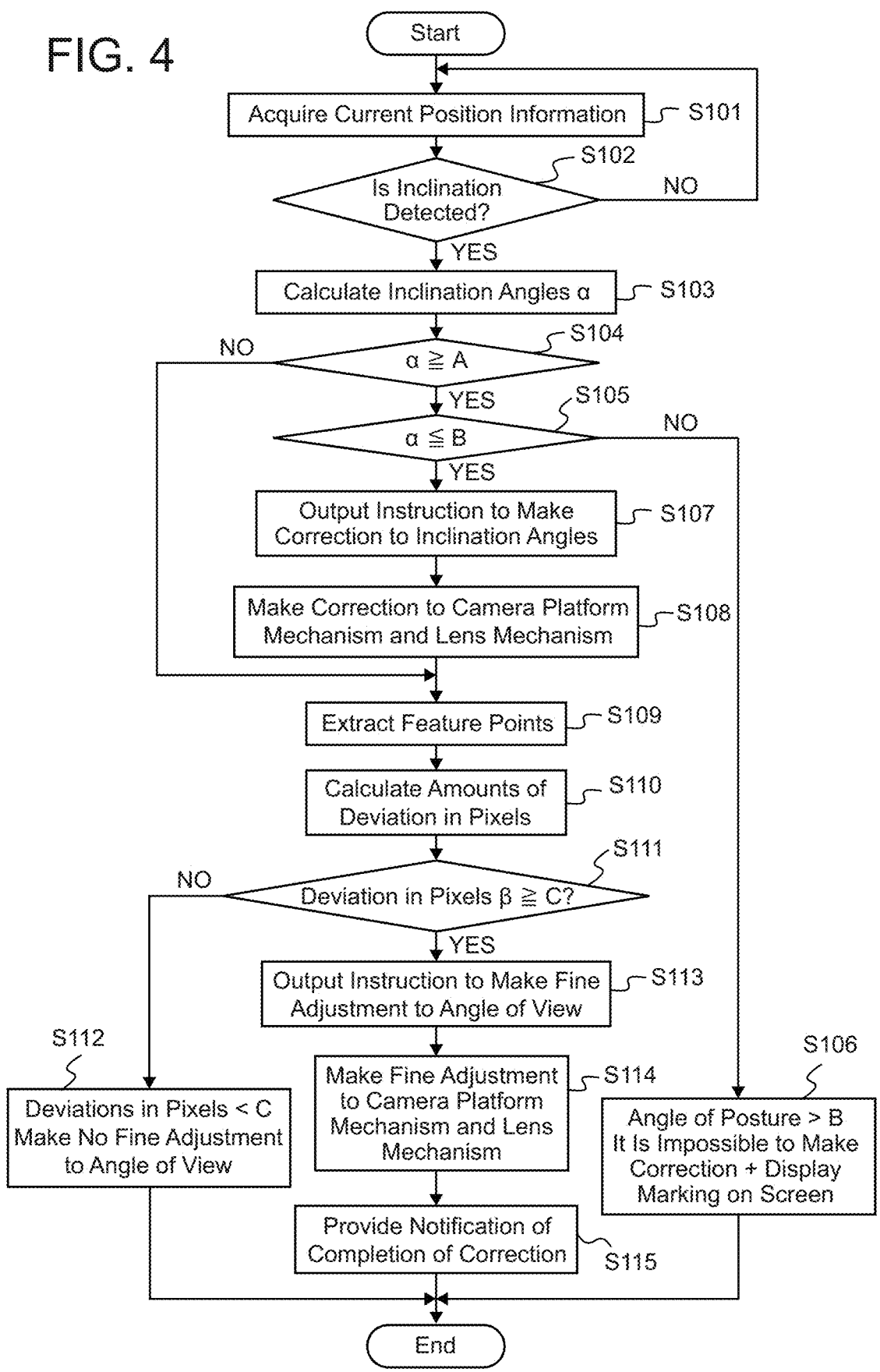
FIG. 4 is a flowchart the operation of the image capturing device according to Embodiment 1 of the present disclosure.

FIG. 4 is a flowchart explaining the operation of the image capturing device 1 according to Embodiment 1 of the present disclosure. A method of making a correction at a time when the position of the angle of view of the image capturing device deviates will be described in turn.

First, when the image capturing device 1 is installed, a process of registering reference position information and image information in the memory 10 is performed at a preset time. When an instruction to start the control is received, the current position information is acquired (step S101).

Next, the existence or nonexistence of an inclination angle is detected using an angular velocity sensor, such as a gyro sensor, of the inclination detecting unit 5 mounted in the image capturing device 1 (step S102). When no inclination angle is detected, the operation returns to step S101. When an inclination angle is detected, the amount of deviation calculating unit 6 integrates the angle data provided by the gyro sensor to calculate the inclination angle α (step S103). The inclination angle is determined for each of the X, Y, and Z axes, and flow processing is performed.

Next, the correcting method determining unit 7 determines whether or not each inclination angle α transmitted from the amount of deviation calculating unit 6 is equal to or greater than the lower limit A (step S104).

The case in which the determination result is NO in step S104 is the case in which the inclination angles α are less than the lower limit A. In this case, it is not necessary to make a correction to the inclination of the posture, and the operation advances to step S109 in order to make a fine adjustment to the angle of view.

When at least one of the inclination angles α is equal to or greater than the lower limit A, whether or not the inclination angles α are equal to or less than the upper limit B is further determined (step S105).

When the determination result is NO in step S105, i.e. when at least one of the inclination angles α is greater than the upper limit B, it is determined that it is impossible to make a correction to the posture of the image capturing device, and, while a notification that no correction has been made is provided for the next-stage system, a marking showing that no correction has been made is superimposed on the screen (step S106), and the operation is ended. In the next-stage system, because the fact that "although the image capturing device has been inclined, no correction has been made because an inclination angle is greater than a correctable angle" is known as a result, no PTZ operation is performed. In addition, even when an object to be captured cannot be captured in the angle of view and it becomes impossible to perform surveillance, it is possible to easily identify which image capturing device is the inclined from the marking displayed on the screen, and it is therefore possible to cope with the failure at an early stage by sending a worker for inclination removal to the spot, for example.

When at least one of the inclination angles α is equal to or greater than the lower limit A in step S104 and the inclination angles α are equal to or less than the upper limit B in step S105, it is determined that an inclination correction can be made, electric signals for moving the PAN camera platform, the TILT camera platform, and the zoom lens are transmitted to a driving circuit in the PTZ operating unit 8, and an instruction to perform a PTZ operation is outputted (step S107). On the basis of the pieces of digital data transmitted from the correcting method determining unit 7, the pieces of digital data being associated with the amounts of movements of the PAN camera platform 20 and the TILT camera platform 21 which are needed in order to restore the angles of the image capturing device 1 to the ones before inclined, the PTZ operating unit 8 transmits the electric signals to the driving circuit that moves the PAN camera platform 20 and the TILT camera platform 21, to make a correction to the inclination of the image capturing device 1. After a correction is made to the camera platform mechanism 22, a comparison between digital data recorded in the memory 10 and showing the position of the lens mechanism 2 before the posture of the image capturing device 1 has been inclined, and digital data showing the position of the lens mechanism 2 after the posture of the image capturing device 1 has been inclined is made, and a correction is made to the lens mechanism 2 in such a way that the posture of the image capturing device 1 becomes the same as that at a zoom position before the posture has been inclined (step S108).

The inclination of the posture of the image capturing device is corrected through the above-mentioned operation. Next, the operation advances to step S109 in order to make a correction to the angle of view of the captured image, and a fine adjustment to the angle of view is made. Concretely, an event signal showing determination of whether or not it is necessary to make a fine adjustment to the angle of view in the image capturing device 1 is generated by the inclination detecting unit 5, and this event signal is transmitted to the feature point extracting unit 9. When receiving this event signal, the feature point extracting unit 9 reads the reference position image recorded in the memory 10, extracts the reference image feature point Ch1 on the basis of the reference position image and also extracts the current image feature point Ch2 on the basis of the current position image (current image) (step S109), and transmits the pieces of image data about the feature points Ch1 and Ch2 to the amount of deviation calculating unit 6.

The amount of deviation calculating unit 6 makes a comparison between the feature points Ch1 and Ch2 (a matching process), and calculates amounts of deviation in pixels β (step S110).

Next, the correcting method determining unit 7 determines whether or not to make a fine adjustment to the inclination of the angle of view of the image capturing device 1 on the basis of the data transmitted from the amount of deviation calculating unit 6 (step S111). When the determination result is NO in step S111, i.e. when the amounts of deviation (in pixels) β are less than the fine adjustment lower limit C, it is determined that a fine adjustment to the angle of view is not needed, and a notification that no correction to the angle of view has been made because the amounts of deviation are less than the fine adjustment lower limit is provided for the next-stage system (step S112), and the operation is ended.

When at least one of the amounts of deviation in pixels β is equal to or greater than the fine adjustment lower limit C, an instruction to make a fine adjustment to the angle of view is outputted (step S113). A PTZ operation on the camera platform mechanism 22 and the lens mechanism 2 is performed, so that a fine adjustment is made to the angle of view (step S114).

After a fine adjustment is made to the inclination of the angle of view in step S114, a notification of the completion of the correction to the angle of view is provided for the next-stage system (step S115), and the operation is ended.

Because the image capturing device of Embodiment 1 is configured and operates as mentioned above, there is provided an advantage of, even when the deviation of the image capture area is large, making a fine adjustment to the inclination of the angle of view after automatically making a correction to the inclination of the image capturing device, which is detected by the gyro sensor or the like, thereby providing a captured image efficiently and correctly.

Embodiment 2

In Embodiment 1, the image capturing device 1 periodically observes a change of its posture, and, when its inclination is detected and it is then determined that it is necessary to make an adjustment to the angle of view, automatically makes a correction to the inclination of the posture of the image capturing device and, after that, makes a fine adjustment to the angle of view.

In an image capturing device according to Embodiment 2, the image capturing device 1, when its inclination is detected, either makes corrections starting from an inclination correction to the posture, like that of Embodiment 1, or makes only a fine adjustment to the angle of view, by making a selection after determining a correcting method having a shorter processing time.

Because the configuration of the image capturing device according to this Embodiment 2 is the same as that of the image capturing device according to Embodiment 1 shown in FIG. 1, an explanation of the configuration will be omitted hereafter.

Figure 5:
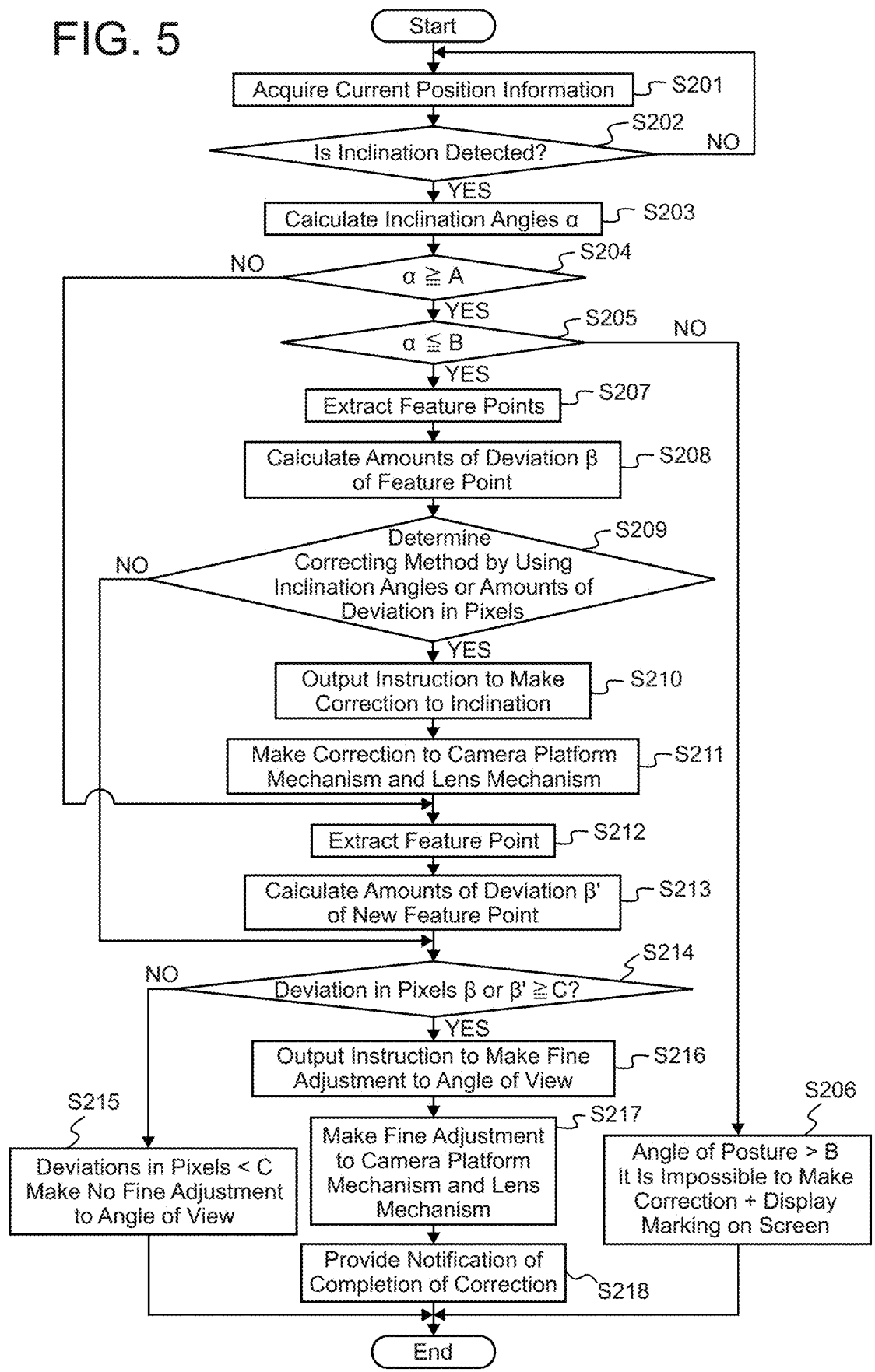
FIG. 5 is a flowchart the operation of the image capturing device according to Embodiment 2 of the present disclosure.

FIG. 5 is a flowchart for explaining the operation of the image capturing device according to Embodiment 2. Correcting methods of the image capturing device according to Embodiment 2 will be described in turn.

When the image capturing device is installed, a process of registering reference position information and image information in a memory 10 is performed at a preset time, like in the case of Embodiment 1. When an instruction to start control is received, the current position information is acquired (step S201).

Next, the existence or nonexistence of an inclination angle is detected using an angular velocity sensor, such as a gyro sensor, of an inclination detecting unit 5 mounted in the image capturing device 1 (step S202). When no inclination angle is detected, the operation returns to step S201. When an inclination angle is detected, an amount of deviation calculating unit 6 integrates an angular speed (one form of angle data) acquired from the gyro sensor to calculate the inclination angle α (step S203). Such an inclination angle is determined for each of the X axis, Y axis, and Z axis, and flow processing is performed.

Next, a correcting method determining unit 7 determines whether or not each inclination angle α transmitted from the amount of deviation calculating unit 6 is equal to or greater than a lower limit A (step S204).

When the determination result is NO in step S204, i.e. when the inclination angles α are less than the lower limit A, it is not necessary to make a correction to the inclination of the posture, the operation advances to step S212, and only a fine adjustment to the angle of view is made. The subsequent processes are the same as those in step S109 and subsequent steps of Embodiment 1.

When at least one of the inclination angles α is equal to or greater than the lower limit A, whether or not the inclination angles α are equal to or less than an upper limit B (e.g. B=±90 degrees) is further determined (step S205).

When the determination result is NO in step S205, i.e. when at least one of the inclination angles α of the posture of the image capturing device is greater than the upper limit B, it is determined that it is impossible to make a correction to the inclination of the posture, and, while a notification that no correction has been made is provided for a next-stage system, a marking showing that no correction has been made is superimposed on a screen (step S206), and the operation is ended.

When an inclination angle α is equal to or greater than the lower limit A in step S204, and the inclination angles α are equal to or less than the upper limit B in step S205, it is determined that an inclination correction can be made, an event signal showing that an inclination has occurred in the image capturing device 1 is generated by the inclination detecting unit 5, and this event signal is transmitted to a feature point extracting unit 9. When receiving this event signal, the feature point extracting unit 9 reads a reference position image recorded in the memory 10, extracts a feature point Ch1 on the basis of this reference position image and also extracts a feature point Ch2 on the basis of a current position image (current image) (step S207), and transmits the pieces of image data about the feature points Ch1 and Ch2 to the amount of deviation calculating unit 6. For example, a signal showing that the current image greatly deviates and the feature point Ch2 cannot be extracted is also transmitted simultaneously to the amount of deviation calculating unit 6.

The amount of deviation calculating unit 6 makes a comparison between the feature points Ch1 and Ch2 (a matching process), and calculates amounts of deviation in pixels β (step S208).

The correcting method determining unit 7 determines a correcting method from the inclination angles α and the amounts of deviation in pixels β which are transmitted from the amount of deviation calculating unit 6 (step S209).

A flowchart of the process of step S209 is shown in FIG. 6. In step S209, the time that is required for an PTZ operation orbit and the correcting operation when a fine adjustment is made to the angle of view after the inclination angles α are corrected is calculated (step S219), and the time required for an PTZ operation orbit and the correcting operation when only the amount of deviations in pixels β are corrected is also calculated (step S229). Both the times required for the correction are compared, and a more efficient correcting method is determined (step S239).

When it is determined that the method of making corrections starting from a correction to the inclination angle of the image capturing device has a shorter time required for the correction or when the inclination is large and therefore it is impossible to extract the feature point Ch2, after the inclination angles are corrected in step S210, the feature points are extracted again and a fine adjustment to the angle of view is made. When it is determined that it is not necessary to make a correction to the inclination angles and the method of making only a fine adjustment to the angle of view has a shorter time required for the correction, the operation advances to step S214.

In step S210, the correcting method determining unit 7 outputs an instruction to restore the angles of the image capturing device 1 to the ones before inclined. Subsequent processes following this process are the same as those of the flowchart of step S107 and subsequent steps of Embodiment 1.

On the basis of pieces of digital data transmitted from the correcting method determining unit 7, the pieces of digital data being associated with the amounts of movements of a PAN camera platform 20 and a TILT camera platform 21 which are needed in order to restore the angles of the image capturing device 1 to the ones before inclined, a PTZ operating unit 8 transmits electric signals to a driving circuit that moves the PAN camera platform 20 and the TILT camera platform 21 and that is included in the PTZ operating unit 8, to make a correction to the inclination of the image capturing device 1. After a correction is made to a camera platform mechanism 22, a comparison between digital data recorded in the memory 10 and showing the position of a lens mechanism 2 before the posture of the image capturing device 1 has been inclined, and digital data showing the position of the lens mechanism 2 after the posture of the image capturing device 1 has been inclined is made, and a correction is made to the lens mechanism 2 in such a way that the posture of the image capturing device 1 becomes the same as that at a zoom position before the posture has been inclined (step S211).

The inclination of the posture is corrected through the above-mentioned operation. Next, the operation advances to step S212 in order to make a correction to the angle of view of a captured image, and a fine adjustment to the angle of view is made. Concretely, an event signal showing determination of whether or not it is necessary to make a fine adjustment to the angle of view in the image capturing device is generated by the inclination detecting unit 5, and this event signal is transmitted to the feature point extracting unit 9. When receiving this event signal, the feature point extracting unit 9 extracts a new feature point Ch3 from the image after the correction of the inclination angles, i.e. the newest image currently being captured (step S212), and transmits the image data about Ch3 to the amount of deviation calculating unit 6.

The amount of deviation calculating unit 6 makes a comparison between the already-transmitted feature point Ch1 of the reference position image and the new feature point Ch3 of the newest image (a matching process), and calculates amounts of deviation in pixels $\beta'$ (step S213).

Next, the correcting method determining unit 7 determines whether or not to make a fine adjustment to the inclination of the angle of view of the image capturing device 1 on the basis of the data transmitted from the amount of deviation calculating unit 6 (step S214). The case in which the determination result is NO in step S214 is the case in which the amounts of deviation in pixels $\beta'$ are less than a fine adjustment lower limit C. In this case, it is determined that it is not necessary to make a fine adjustment to the angle of view, a notification that the amounts of deviation are less than the fine adjustment lower limit and no fine adjustment to the angle of view has been made is provided for the next-stage system (step S215), and the operation is ended.

When at least one of the amounts of deviation in pixels $\beta'$ is equal to or greater than the fine adjustment lower limit C, an instruction to make a fine adjustment to the angle of view is outputted (step S216). A PTZ operation on the camera platform mechanism 22 and the lens mechanism 2 is performed to make a fine adjustment to the angle of view (step S217).

After a fine adjustment is made to the inclination of the angle of view in step S217, a notification that the correction to the angle of view is completed is provided for the next-stage system (step S218), and the operation is ended.

In contrast, when it is determined in step S209 that the time required for the correction to make only a fine adjustment to the angle of view is shorter and it is not necessary to make corrections starting from a correction to the inclination angle, the processes of steps S210 to S213 are not performed, and the processes of step S214 and subsequent steps are performed.

The correcting method determining unit 7 compares the amounts of deviation (pixel) $\beta$ already calculated in step S208 with the fine adjustment lower limit C (step S214), and determines whether or not it is possible to make a fine adjustment to the angle of view. Because the subsequent steps S214 to S218 are the same as those of Embodiment 1, a detailed explanation will be omitted.

Because the image capturing device according to Embodiment 2 is configured and operates as mentioned above, while the image capturing device automatically detects an inclination of an image capture area by using an angle sensor or the like and makes a correction to the inclination, like the image capturing device according to Embodiment 1, the image capturing device of Embodiment 2 also calculates the amounts of deviation in pixels simultaneously as well as the inclination angles and makes a comparison, and determines an efficient correcting method, unlike in the case in Embodiment 1 of making a fine adjustment to the inclination of the angle of view after automatically making a correction to the inclination angles of the image capturing device. As a result, because a correcting method having a shorter time required for the correction can be determined and performed selectively out of the method of making a fine adjustment to the inclination of the angle of view after making a correction to the inclination angles on the basis of the amount of inclination of the image capturing device, and the method of making only a fine adjustment to the angle of view on the basis of the amounts of deviation in pixels, a captured image can be acquired more efficiently with a high degree of accuracy.

Although the example in which the inclination detecting unit 5 includes a gyro sensor is shown in Embodiment 1 and in Embodiment 2, the present disclosure is not limited to this example, and, for example, an acceleration sensor may be used. In the case of using an acceleration sensor, the inclination angles of the image capturing device can be calculated from measurement data about acceleration in one to three axes (one form of angle data).

As an alternative, both a gyro sensor and an acceleration sensor may be used. In this case, an inclination of the image capturing device can be detected with a higher degree of accuracy in combination with a high pass filter (HPF) and a low pass filter (LPF).

REFERENCE SIGNS LIST

1 image capturing device,
1a image capturing device control unit,
2 lens mechanism,
3 image capturing unit,
4 image inputting unit,
5 inclination detecting unit,
6 amount of deviation calculating unit,
7 correcting method determining unit,
8 PTZ operating unit,
9 feature point extracting unit,
10 memory,
20 PAN camera platform,
21 TILT camera platform,
22 camera platform mechanism,
30a rotation angle around X axis,
30b rotation angle around Y axis, and
30c rotation angle around Z axis.

The invention claimed is:

1. An image capturing device comprising:
a camera platform mechanism;
a lens mechanism; and
a controller having
  image capturing circuitry to perform analog to digital conversion on an image transmitted from the lens mechanism,
  image inputting circuitry to perform image processing on a digital signal transmitted from the image capturing circuitry,
  a memory to record an image processed by the image inputting circuitry,
  inclination detecting circuitry to detect an inclination from a reference position and output the inclination as angle data, feature point extracting circuitry to extract, on a basis of both a reference position image and a current position image, respective feature points, amount of deviation calculating circuitry to calculate an inclination angle on a basis of the angle data, and calculate an amount of deviation in pixels on a basis of the feature points, correcting method determining circuitry to, when it is determined that the inclination angle is within a range in which the angle can be corrected, the range being equal to or greater than a lower limit and equal to or less than an upper limit, provide a correction instruction to make a correction to the inclination angle and then make a fine adjustment to an inclination of an angle of view, whereas when the inclination angle is less than the lower limit, provide an instruction to make a fine adjustment to the inclination of the angle of view, and pan tilt zoom operating circuitry to control the camera platform mechanism and the lens mechanism on a basis of the instruction of the correcting method determining circuitry.

2. The image capturing device according to claim 1, wherein when the inclination angle is greater than the upper limit, the correcting method determining circuitry causes the image inputting circuitry to display a marking on a screen.

3. The image capturing device according to claim 1, wherein when the amount of deviation in pixels is less than a fine adjustment lower limit, the correcting method determining circuitry causes the image inputting circuitry to display a message showing that the amount of deviation in pixels is less than the fine adjustment lower limit on a screen.

4. The image capturing device according to claim 1, wherein the inclination detecting circuitry detects, in an X axis direction, in a Y axis direction, and in a Z axis direction with respect to the reference position, respective inclinations.

5. The image capturing device according to claim 1, wherein the inclination detecting circuitry includes a gyro sensor or an acceleration sensor.

6. An image capturing device comprising:
a camera platform mechanism;
a lens mechanism; and
a controller having
image capturing circuitry to perform analog to digital conversion on an image transmitted from the lens mechanism,
image inputting circuitry to perform image processing on a digital signal transmitted from the image capturing circuitry,
a memory to record an image processed by the image inputting circuitry,
inclination detecting circuitry to detect an inclination from a reference position and outputting the inclination as angle data,
feature point extracting circuitry to extract, on a basis of both a reference position image and a current position image, respective feature points,
amount of deviation calculating circuitry to calculate an inclination angle on a basis of the angle data, and calculate an amount of deviation in pixels on a basis of the feature points,
correcting method determining circuitry to, when it is determined that the inclination angle is within a range in which the angle can be corrected, the range being equal to or greater than a lower limit and equal to or less than an upper limit, provide an instruction to compare a processing time required to make a correction to the inclination angle and then make a correction to make a fine adjustment to an inclination of an angle of view and a processing time required to make only a correction to make a fine adjustment to the inclination of the angle of view, and select a correcting method which provides a shorter one of the processing times, whereas when the inclination angle is less than the lower limit, provide an instruction to make a correction to make a fine adjustment to the inclination of the angle of view, and
pan tilt zoom operating circuitry to control the camera platform mechanism and the lens mechanism on a basis of the instruction of the correcting method determining circuitry.

7. The image capturing device according to claim 6, wherein when the inclination angle is greater than the upper limit, the correcting method determining circuitry causes the image inputting circuitry to display a marking on a screen.

8. The image capturing device according to claim 6, wherein when the amount of deviation in pixels is less than a fine adjustment lower limit, the correcting method determining circuitry causes the image inputting circuitry to display a message showing that the amount of deviation in pixels is less than the fine adjustment lower limit on a screen.

9. The image capturing device according to claim 6, wherein the inclination detecting circuitry detects, in an X axis direction, in a Y axis direction, and in a Z axis direction with respect to the reference position, respective inclinations.

10. The image capturing device according to claim 6, wherein the inclination detecting circuitry includes a gyro sensor or an acceleration sensor.

* * * * *